United States Patent
Kinoshita (10) Patent No.: US 10,613,043 B2
(45) Date of Patent: Apr. 7, 2020

(54) METHOD AND APPARATUS FOR SAMPLE ANALYSIS

(71) Applicant: JEOL Ltd., Tokyo (JP)

(72) Inventor: Shingo Kinoshita, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 16/273,658

(22) Filed: Feb. 12, 2019

(65) Prior Publication Data

US 2019/0187080 A1 Jun. 20, 2019

Related U.S. Application Data

(63) Continuation of application No. 14/178,630, filed on Feb. 12, 2014, now abandoned.

(30) Foreign Application Priority Data

Feb. 14, 2013 (JP) .................................. 2013-026248

(51) Int. Cl.
G01N 23/2252 (2018.01)
(52) U.S. Cl.
CPC .................. *G01N 23/2252* (2013.01)
(58) Field of Classification Search
CPC ................................................ G01N 23/2252
See application file for complete search history.

(56) References Cited

U.S. PATENT DOCUMENTS

| 7,202,475 B1 | 4/2007 | Testoni |
| 2008/0159475 A1 | 7/2008 | Mazor et al. |
| 2010/0030488 A1 | 2/2010 | Statham |

FOREIGN PATENT DOCUMENTS

| JP | 6182150 A | 4/1986 |
| JP | 2010223898 A | 10/2010 |

*Primary Examiner* — Manuel L Barbee
(74) *Attorney, Agent, or Firm* — The Webb Law Firm (57) ABSTRACT

A method of sample analysis is offered which provides improved quantitative accuracy. This method starts with irradiating a sample with an electron beam. Characteristic X-rays emanating from the sample are detected. Plural data sets about intensities of characteristic X-rays corresponding to a specific element contained in the sample are obtained. The element is quantitatively analyzed based on the plural data sets. This method includes a step (S20) for calculating quantitative values for the element for the plural data sets, respectively, about the characteristic X-ray intensities, a step (S30) for calculating weights for the quantitative values, respectively, based on the plural data sets about the characteristic X-ray intensities, and a step (S40) for calculating a weighted average of the quantitative values based on the weights.

8 Claims, 5 Drawing Sheets

METHOD AND APPARATUS FOR SAMPLE ANALYSIS

CROSS REFERENCE TO RELATED APPLICATIONS

This application is a continuation of U.S. patent application Ser. No. 14/178,630, filed Feb. 12, 2014, which claims priority to Japanese Patent Application No. 2013-026248, filed Feb. 14, 2013, the disclosures of which are hereby incorporated in their entireties by reference.

BACKGROUND OF THE INVENTION

Field of the Invention

The present invention relates to a method and apparatus for sample analysis.

Description of Related Art

A sample analyzer having the configurations of an electron probe microanalyzer performs a qualitative analysis or quantitative analysis of a specific element contained in a sample by directing an electron beam at the sample and detecting characteristic X-rays emanating from the sample in response to the incident electron beam by means of an X-ray spectrometer. Known X-ray spectrometers for detecting characteristic X-rays include a wavelength-dispersive X-ray spectrometer (WDS) and an energy-dispersive X-ray spectrometer (EDS). There is a demand for such sample analyzers showing high quantitative accuracy.

For example, in JP-A-61-82150, there is disclosed an X-ray spectroscopic analyzer system in which plural X-ray spectrometers are disposed. This system produces, displays, and records the sum of the outputs from these X-ray spectrometers. In this disclosed technique, the plural X-ray spectrometers are arranged to provide enhanced detection sensitivity and improved quantitative accuracy.

For example, JP-A-2010-223898 states that a quantitative analysis of an element to be analyzed quantitatively is performed based on the intensities of detected Lα line, Lβ line, and Lι line of the corresponding characteristic X-rays while suppressing the effects of chemical shifts.

For example, where a sample analyzer equipped with a plurality of X-ray spectrometers is used and the X-ray intensities detected respectively by the X-ray spectrometers are converted into concentration values using a calibration line, i.e., where a concentration value is found for each individual X-ray spectrometer, a concentration value (in weight % or atomic weight %) is obtained for each X-ray spectrometer irrespective of the original X-ray intensity.

Where a concentration value is found for each X-ray spectrometer in this way, when a resultant concentration of these concentration values (i.e., an average concentration) is found, if the average value is simply found by summing these concentration values and dividing the sum by the number of data items (i.e., the number of concentration values), then a concentration value found from a low X-ray intensity is reflected at the resultant concentration equivalently to a concentration value found from a high X-ray concentration. As a result, the contribution of the lower X-ray intensity per unit intensity determining the former concentration value is reflected to a greater extent than the contribution of the higher X-ray intensity per unit intensity determining the latter concentration. Consequently, the quantitative accuracy may be impaired.

SUMMARY OF THE INVENTION

In view of the foregoing, the present invention has been made. One object associated with some aspects of the present invention is to provide sample analysis method and apparatus capable of performing quantitative analyses based on plural sets of data about characteristic X-ray intensities with enhanced quantitative accuracy.

(1) A method of sample analysis associated with the present invention performs a quantitative analysis of a specific element contained in a sample by irradiating the sample with an electron beam, detecting characteristic X-rays emanating from the sample, obtaining plural data sets about intensities of the characteristic X-rays corresponding to the specific element, and carrying out the quantitative analysis of the element based on the data sets about the characteristic X-ray intensities. This method starts with calculating quantitative values for the element for the plural data sets, respectively, about the characteristic X-ray intensities. Then, weights for the quantitative values are calculated, based on the plural data sets about the characteristic X-ray intensities. Based on the weights, a weighted average of the quantitative values is calculated.

In this method of sample analysis, a quantitative value for a specific element is computed for each of plural data sets about the characteristic X-ray intensities. Weights for the quantitative values are computed and their weighted average is calculated. Therefore, for example, as compared with the case where plural quantitative values arithmetically derived from plural data sets about characteristic X-ray intensities are straightforwardly averaged out, higher quantitative accuracy can be obtained because the quantitative values are weighted according to the characteristic X-ray intensity data.

Furthermore, if the plural data sets about characteristic X-ray intensities are obtained by detecting different types of characteristic X-rays (e.g., K and L lines) emitted from the specific element to be quantitatively analyzed, high quantitative accuracy can be had.

(2) In one feature of this method of sample analysis, the plural data sets about the characteristic X-ray intensities may be obtained by preparing an electron probe microanalyzer equipped with a plurality of spectrometers and detecting characteristic X-rays emanating from the sample by the spectrometers.

(3) In another feature of this method of sample analysis, the weights may be peak intensities of characteristic X-rays corresponding to the element.

(4) In a further feature of this method of sample analysis, each of the weights may be a ratio of a peak intensity of the characteristic X-rays corresponding to the element to a background intensity.

(5) A sample analyzer associated with the present invention performs a quantitative analysis of a specific element contained in a sample by irradiating the sample with an electron beam, detecting characteristic X-rays emanating from the sample, obtaining plural data sets about intensities of the characteristic X-rays corresponding to the specific element, and carrying out the quantitative analysis of the element based on the plural data sets about the characteristic X-ray intensities. The sample analyzer includes: a quantitative value calculator for calculating a quantitative value for the element for each of the plural sets on the characteristic X-ray intensities; a weight calculator for calculating weights respectively for the quantitative values based on the plural data sets about the characteristic X-ray intensities; and a weighted average calculator for calculating a weighted average of the quantitative values based on the weights.

In this sample analyzer, quantitative values for the specific element are calculated for the plural data sets, respectively, about the characteristic X-ray intensities. Weights for the quantitative values are calculated, and a weighted average is computed. Therefore, unlike the case where plural quantitative values found from plural data sets about characteristic X-ray intensities are straightforwardly averaged out, quantitative values are weighted according to the data about the characteristic X-ray intensities. Consequently, the quantitative accuracy can be enhanced.

Furthermore, if the plural data sets about the characteristic X-ray intensities are obtained by detecting different types of characteristic X-rays (such as K and L lines) emanating from the specific sample to be analyzed quantitatively, high quantitative accuracy can be obtained.

(6) In one feature of this sample analyzer, there may be provided a plurality of spectrometers via which the plural data sets about the characteristic X-ray intensities may be obtained.

(7) In a further feature of this sample analyzer, the weights may be peak intensities of characteristic x-rays corresponding to the element.

(8) In an additional feature of this sample analyzer, each of the weights may be a ratio of a peak intensity of the characteristic X-rays corresponding to the element to a background intensity.

DESCRIPTION OF THE INVENTION

The preferred embodiments of the present invention are hereinafter described in detail with reference to the drawings. It is to be noted that the embodiment provided below does not unduly restrict the contents of the present invention delineated by the appended claims and that not all the configurations set forth below are constituent elements of the invention.

1. Configuration of Sample Analyzer

Figure 1:
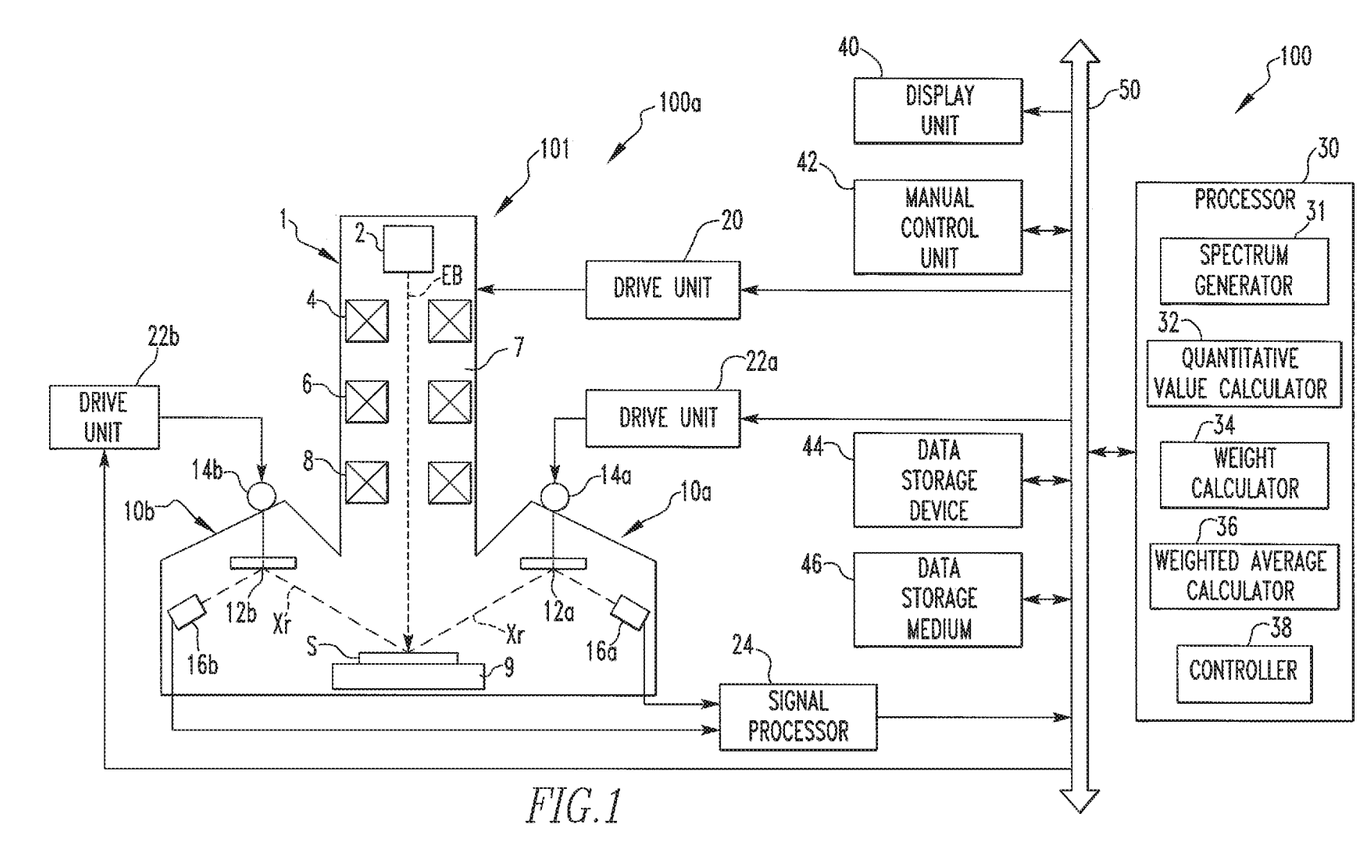
FIG. 1 is a schematic block diagram of a sample analyzer associated with one embodiment of the present invention.

The configuration of a sample analyzer associated with one embodiment of the present invention is described by referring to FIG. 1, where the sample analyzer is generally indicated by reference numeral 100. The sample analyzer 100 has spectrometers 10a, 10b, 10c, 10d, and 10e as shown in FIG. 2.

As shown in FIG. 1, the sample analyzer 100 associated with the present embodiment is configured including an analyzer body 100a, a processor 30, a display unit 40, a manual control unit 42, a data storage device 44, and a data storage medium 46. The sample analyzer 100 can perform quantitative analysis of a specific element (element of interest) contained in a sample S by irradiating the sample S with an electron beam EB, detecting characteristic X-rays, Xr, emanating from the sample S by the spectrometers 10a-10e (FIG. 2), obtaining plural data sets about characteristic X-ray intensities of the element to be analyzed, and processing the data sets. The quantitative analysis referred to herein is an analysis method of quantitatively treating the amounts of elements within a region to be analyzed during an elemental analysis. The results of the quantitative analysis can be expressed, for example, in terms of weight percent (wt %) or atomic weight percent (at wt %).

Figure 2:
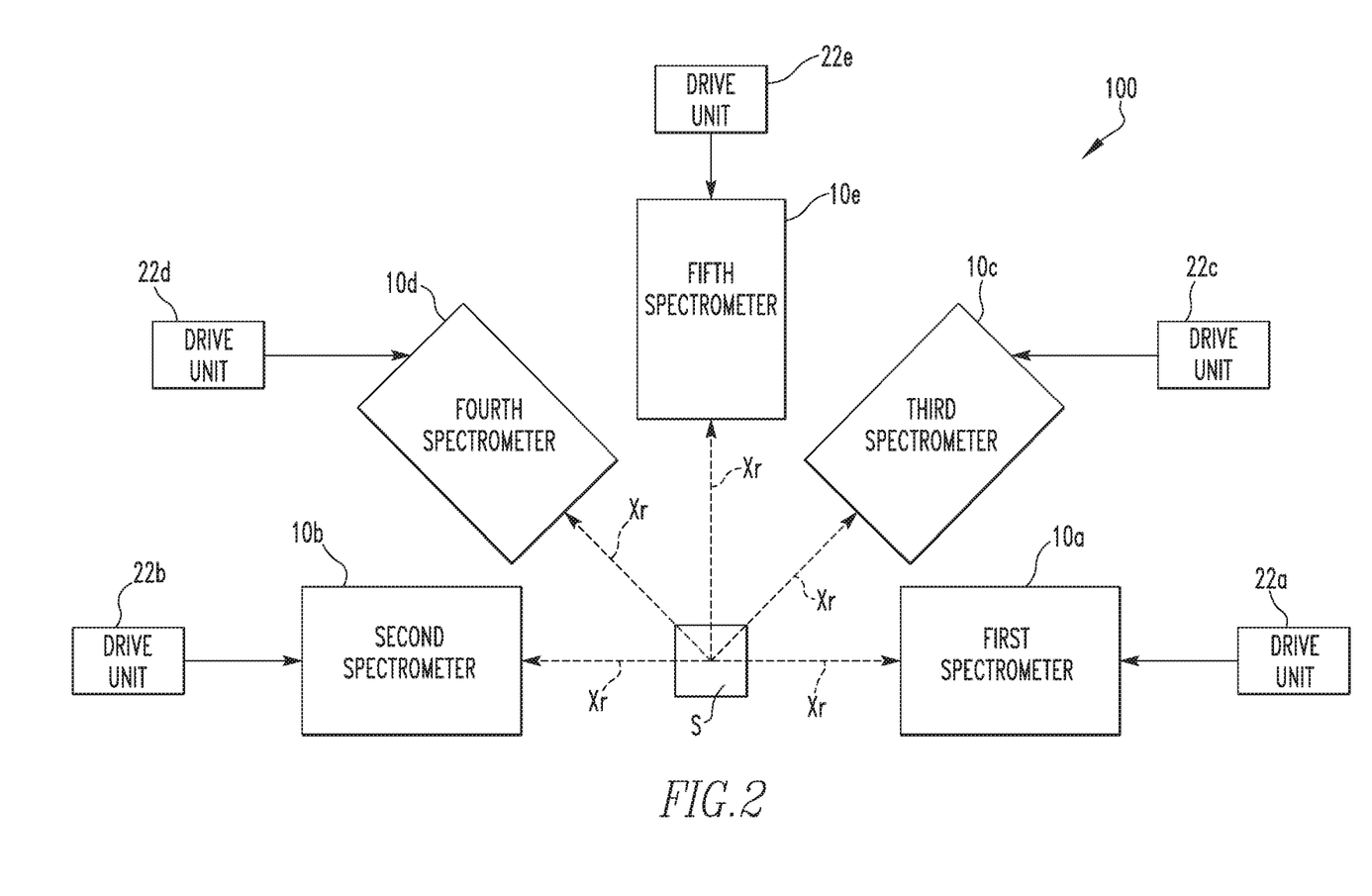
FIG. 2 is a block diagram of the sample analyzer shown in FIG. 1, showing the configurations of spectrometers.

As shown in FIGS. 1 and 2, the analyzer body 100a is configured including an electron optical column 1, an electron gun 2, condenser lenses 4, deflectors 6, an objective lens 8, a sample stage 9, the spectrometers 10a-10e, drive units 20, 22a, 22b, 22c, 22d, 22e, and a signal processor 24.

The electron gun 2, condenser lenses 4, deflectors 6, and objective lens 8 are disposed inside the electron optical column 1 whose interior is evacuated to a vacuum by vacuum pumping equipment (not shown).

The electron gun 2 emits an electron beam EB, which is accelerated by a given accelerating voltage, toward the sample S.

The condenser lenses 4 operating to focus the electron beam EB are disposed behind (downstream along the electron beam EB) the electron gun 2.

The deflectors 6 are disposed behind the condenser lenses 4 and can deflect the electron beam EB.

The objective lens 8 is located behind the deflectors 6. The objective lens 8 sharply focuses the electron beam EB on the sample S such that the electron beam EB is directed as an electron probe at the sample S.

The electron gun 2, condenser lenses 4, deflectors 6, and objective lens 8 together constitute an electron optical system 101 of the analyzer body 100a. The electron optical system 101 is driven by the drive unit 20. The electron gun 2, condenser lenses 4, deflectors 6, and objective lens 8 are operated and controlled by the drive unit 20.

The sample stage 9 and spectrometers 10a, 10b, 10c, 10d, and 10e are disposed within a sample chamber 7. The interior of the chamber 7 is pumped down to a vacuum by vacuum pumping equipment (not shown).

The sample S is placed on the sample stage 9, which can support the sample S thereon. The sample stage 9 is moved by operation of a stage drive mechanism (not shown) having a drive source such as an electric motor. The stage drive mechanism is under control of a controller 38. Because the sample stage 9 is moved, it is possible to relatively move the position of analysis on the sample S hit by the electron beam EB focused as the electron probe.

For example, the first spectrometer 10a is a wavelength-dispersive spectrometer (WDS). The first spectrometer 10a is configured including an analyzer crystal 12a, an analyzer crystal driving mechanism 14a, and an X-ray detector 16a.

The analyzer crystal 12a operates to disperse X-rays by making use of diffraction of X-rays in the crystal. The analyzer crystal 12a is made, for example, of LiF (lithium fluoride), TAPH, TAP (thallium acid phthalate), or STE (stearate).

The analyzer crystal driving mechanism 14a has a drive source consisting of an electric motor or the like. The driving mechanism 14a is driven by the drive unit 22a and moves the analyzer crystal 12a. As the analyzer crystal 12a moves, the X-ray detector 16a also moves. Characteristic X-rays having a wavelength corresponding to the reached position are detected by the X-ray detector 16a.

The X-ray detector 16a detects X-rays of a certain wavelength spectrally dispersed by the analyzer crystal 12a. The X-ray detector 16a converts the detected X-rays into a pulsed signal having a pulse height corresponding to the strength of the X-ray energy and outputs the signal.

The second spectrometer 10b is a wavelength-dispersive X-ray spectrometer (WDS), for example. The second spectrometer 10b is configured including an analyzer crystal 12b, an analyzer crystal driving mechanism 14b, and an X-ray detector 16b. The components 12b, 14b, and 16b of the second spectrometer 10b are similar to the components 12a, 14a, and 16a, respectively, of the aforementioned analyzer crystal 12a and a description thereof is omitted.

As shown in FIG. 2, the analyzer body 100a further includes the third spectrometer 10c, fourth spectrometer 10d, and fifth spectrometer 10e. Each of the third spectrometer 10c, fourth spectrometer 10d, and fifth spectrometer 10e is a wavelength-dispersive X-ray spectrometer (WDS) in the same way as the first spectrometer 10a. The third spectrometer 10c, fourth spectrometer 10d, and fifth spectrometer 10e are similar in configuration with the first spectrometer 10a. For example, the first through fifth spectrometers 10a-10e have different analyzer crystals. Alternatively, the first through fifth spectrometers 10a-10e may have identical analyzer crystals.

In the sample analyzer 100, the characteristic X-rays, Xr, generated from the sample S hit by the electron beam EB can be measured by the first spectrometer 10a, second spectrometer 10b, third spectrometer 10c, fourth spectrometer 10d, and fifth spectrometer 10e at the same time. The drive mechanisms for the first through fifth spectrometers 10a-10e are driven by the drive units 22a, 22b, 22c, 22d, and 22e, respectively. The spectrometers 10a-10e convert the detected characteristic X-rays, Xr, into pulsed signals having pulse heights corresponding to the strengths of the energies of the characteristic X-rays, Xr, and output the pulsed signals. The pulsed signals are converted into digital data by the signal processor 24.

The drive unit 20 drives the electron optical system 101 of the analyzer body 100a having the electron gun 2, condenser lenses 4, deflectors 6, and objective lens 8. Drive signals are supplied to the drive unit 20 from the controller 38 via a bus line 50. The drive unit 20 drives the electron optical system 101 based on the supplied drive signals.

The drive units 22a, 22b, 22c, 22d, and 22e drive the spectrometers 10a, 10b, 10c, 10d, and 10e, respectively. Drive signals are supplied to the drive units 22a-22e via the bus line 50 from the controller 38. The drive units 22a-22e drive the analyzer crystal driving mechanism based on the supplied driver signals.

The operation of the analyzer body 100a is described now.

In the electron optical system 101 of the analyzer body 100a, the electron beam EB is accelerated by a given accelerating voltage from the electron gun 2 and released toward the sample S. The electron beam EB released from the electron gun 2 is sharply focused by the lens action produced by the condenser lenses 4 and objective lens 8. As a result, the focused electron beam EB (electron probe) is made to impinge on the sample S.

At this time, the electron beam EB is deflected by the deflectors 6 and hits the sample S at a specified position (position of analysis). In this way, the characteristic X-rays, Xr, are produced at the position of analysis on the sample S hit by the electron beam EB.

The first spectrometer 10a spectrally disperses the characteristic X-rays, Xr, emanating from the sample S by means of the analyzer crystal 12a and detects, by the X-ray detector 16a, the characteristic X-rays, Xr, of the given element contained in the sample S and to be analyzed quantitatively. The analyzer crystal driving mechanism 14a moves the analyzer crystal 12a. Since the Bragg angle varies concomitantly with motion of the analyzer crystal 12a, the wavelength of the detected characteristic X-rays, Xr, varies. That is, the X-ray detector 16a detects the characteristic X-rays, Xr, of the wavelength corresponding to the position of the moving analyzer crystal 12a. At this time, the other spectrometers 10b, 10c, 10d, and 10e detect the characteristic X-rays, Xr, in the same way as the first spectrometer 10a.

The spectrometers 10a, 10b, 10c, 10d, and 10e convert the detected characteristic X-rays, Xr, into pulsed signals having pulse heights corresponding to the strengths of the X-ray energies and output the signals. The pulsed signals are converted into digital data by the signal processor 24. The digital data delivered from the signal processor 24 are sent to a spectrum generator 31 via the bus line 50.

Figure 3:
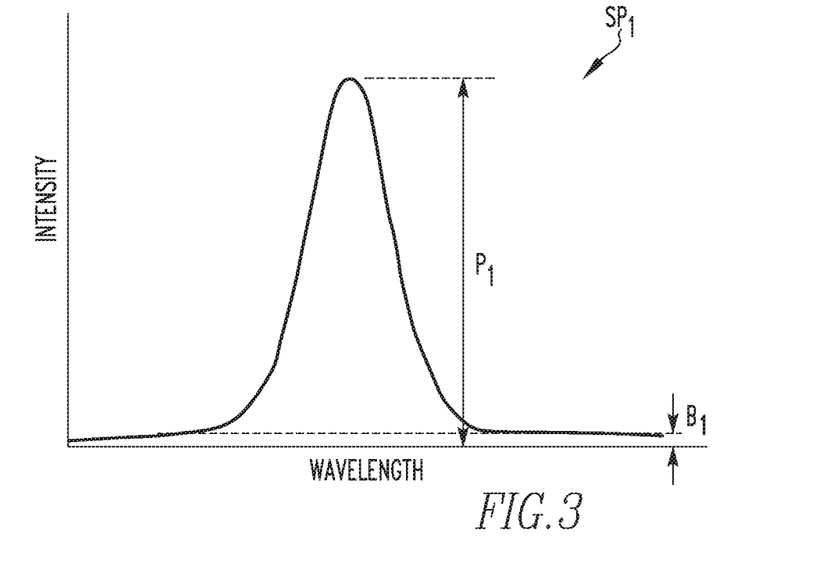
FIG. 3 is a graph showing one example of X-ray spectrum.

The spectrum generator 31 performs given arithmetic processing and generates X-ray spectra of the specific element from the digital data. Plotted on the horizontal axis of each of the X-ray spectra is wavelength, energy, or position where spectral dispersion occurs. Intensity is plotted on the vertical axis. FIG. 3 is a graph showing one example of X-ray spectrum generated by the spectrum generator 31. As shown in this graph, the X-ray spectrum contains information about peak intensities of the given element to be analyzed quantitatively, i.e., data about characteristic X-ray intensities. A peak intensity of a specific element, i.e., an element of interest, referred to herein is the height of a peak of an X-ray spectrum of the specific element to be analyzed quantitatively or the area of the peak. Data about characteristic X-ray intensities is information about the height ($P_1$ in FIG. 3) of a peak produced by the specific element to be analyzed quantitatively. Alternatively, information about the area of a peak of a specific element undergoing quantitative analysis may be used as data about characteristic X-ray intensities.

As described previously, the analyzer body 100a has the five spectrometers 10a, 10b, 10c, 10d, and 10e and so the characteristic X-rays, Xr, produced from the specific element in the sample S can be measured by the five spectrometers 10a, 10b, 10c, 10d, and 10e at the same time. That is, the analyzer body 100a can obtain five X-ray spectra (five data sets about characteristic X-ray intensities) in one measurement.

Based on a display signal entered from the processor 30 via the bus line 50, the display unit 40 displays the results of processing performed by the processor 30 in the form of literal information, graphical information, or other kind of information. The display unit 40 can display the results of quantitative calculations about the specific element to be analyzed quantitatively. For instance, the display unit 40 is a CRT, LCD, touch panel display, or the like.

The manual control unit 42 acquires a control signal responsive to a user's manipulation and sends the signal to the processor 30 via the bus line 50. The manual control unit 42 is a button, key, touch panel display, microphone, or the like.

Programs and data permitting the processor 30 to perform various computational operations and control operations are stored in the data storage device 44. Also, the data storage device 44 is used as a working storage for the processor 30 and also operates to temporarily store a control signal entered from the manual control unit 42, programs and data read from the data storage medium 46, and results of computations executed by the processor 30 according to various programs. The data storage device 44 is connected with the bus line 50.

The data storage medium 46 is a computer-readable storage medium for storing various programs and data. Furthermore, the data storage medium 46 may function as an archival storage for storing data that need to be stored for long terms out of data generated by processing performed by the processor 30. The data storage medium 46 can be accomplished, for example, by optical disc (CD or DVD), magnetooptical disc (MO), magnetic disc, hard disc, magnetic tape, or memory (such as a ROM or flash memory). The data storage medium 46 is connected with the bus line 50.

The processor 30 performs various kinds of computational processing according to a program stored either in the data storage device 44 or in the data storage medium 46. The functions of the processor 30 can be realized by various processors (such as a CPU or DSP), ASIC (such as a gate array), or other hardware or in software. The processor 30 is connected with the bus line 50.

In the present embodiment, the processor 30 operates as the spectrum generator 31, as a quantitative value calculator 32, as a weight calculator 34, as a weighted average calculator 36, and as the controller 38 which are described below by executing the program stored in the data storage device 44. Alternatively, this program may be received from a server connected with a wired or wireless communication network, be stored in the data storage device 44 or data storage medium 46, and be executed. At least a part of the processor 30 may be realized by a dedicated hardware unit.

The spectrum generator 31 generates X-ray spectra from the results of detections made by the spectrometers 10*a*, 10*b*, 10*c*, 10*d*, and 10*e*. In the spectrum generator 31, an X-ray spectrum (see FIG. 3) is generated for each of the spectrometers 10*a*-10*e*. The X-ray spectra generated by the spectrum generator 31 are sent via the bus line 50 to the data storage device 44, where the spectra are stored.

The quantitative value calculator 32 calculates a quantitative value for the specific element for each of plural data sets about intensities of characteristic X-rays of the specific element to be analyzed quantitatively. The quantitative value calculator 32 computes a peak intensity $Int_i$ of the specific element from an X-ray spectrum generated by the spectrum generator 31 and computes a quantitative value for the specific element. The peak intensity $Int_i$ may be a peak height $P_i$ (such as $P_1$ as shown in FIG. 3) or a peak area.

One example of method of calculating a quantitative value for a specific element is now described. In an X-ray spectrum obtained by a spectrometer i, a peak intensity $Int_i$ corresponding to the specific element is given by $$Int_i = A_i \times Conc_i + B_i \qquad (1)$$

where $Conc_i$ is a quantitative value (concentration value) for the specific element and $A_i$ and $B_i$ are calibration line coefficients of the specific element (where i=1, 2, ..., n (n is the number of spectrometers)). The calibration line coefficients $A_i$ and $B_i$ for the specific element are set for each of the spectrometers 10*a*-10*e*. The calibration line coefficients $A_i$ and $B_i$ are obtained, for example, by measuring a reference sample having a known concentration of the specific element by means of the spectrometers 10*a*-10*e*. For example, the calibration line coefficients $A_i$ and $B_i$ for the specific element are previously stored in the data storage device 44.

It can be seen from Eq. (1) above that the quantitative value (concentration value) for the specific element is given by $$Conc_i = \frac{(Int_i - B_i)}{A_i} \qquad (2)$$

The quantitative value calculator 32 calculates the peak intensity $Int_i$ of the specific element from the X-ray spectrum. The calculator 32 computes the quantitative value $Conc_i$ for the specific element using Eq. (2). In the quantitative value calculator 32, quantitative values $Conc_1$, $Conc_2$, $Conc_3$, ..., $Conc_n$ for the specific element are calculated from the n X-ray spectra (data sets about characteristic X-ray intensities), respectively.

The weight calculator 34 calculates a weight for each of the quantitative values $Conc_n$ based on the plural data sets about characteristic X-ray intensities. In the present embodiment, the weight is a peak intensity $Int_i$ of the specific element in an X-ray spectrum. The weight calculator 34 calculates peak intensities $Int_1$, $Int_2$, $Int_3$, ..., $Int_n$ from the n x-ray spectra, respectively.

The weighted average calculator 36 calculates a weighted average, $Conc_{total}$, of quantitative values for the specific element, based on the weights calculated by the weight calculator 34. Weight averaging consists of causing numerical values of various terms to be weighted in proportion to their degrees of importance and taking an average of the values. The weighted average calculator 36 calculates the weighted average, $Conc_{total}$, for example, using Eq. (3) below.

$$\begin{aligned}Conc_{total} = & \left[Conc_1 \times \left(\frac{Int_1}{Int_{total}}\right)\right] \\ & + \left[Conc_2 \times \left(\frac{Int_2}{Int_{total}}\right)\right] \\ & + \left[Conc_3 \times \left(\frac{Int_3}{Int_{total}}\right)\right] \\ & \vdots \\ & + \left[Conc_n \times \left(\frac{Int_n}{Int_{total}}\right)\right]\end{aligned} \qquad (3)$$

$(Int_{total} = Int_1 + Int_2 + Int_3 + ... + Int_n)$

Eq. (3) above can also be represented as follows.

$$Conc_{total} = \frac{\sum_{i=1}^{n}\left\{int_i \cdot \left[\frac{(Int_i - B_i)}{A_i}\right]\right\}}{\sum_{i=1}^{n} Int_i}$$

The controller 38 controls the electron optical system 101 of the analyzer body 100*a*. The controller 38 operates the electron optical system 101 of the analyzer body 100*a* by sending a drive signal to the drive unit 20. Furthermore, the controller 38 controls the analyzer crystal driving mechanisms for the spectrometers 10*a*, 10*b*, 10*c*, 10*d*, and 10*e*. The controller 38 operates the analyzer crystal driving mechanisms for the spectrometers 10*a*-10*e* by sending drive signals to the drive units 22*a*-22*e*.

2. Operation of Processor of Sample Analyzer

Quantitative analysis performed by the processor 30 of the sample analyzer 100 is next described.

Before the processor 30 performs a quantitative analysis, the analyzer body 100a performs measurements on the sample S.

In particular, the user first selects a specific element to be analyzed quantitatively. Furthermore, the user selects names and orders of X rays emanating from the specific element to be analyzed quantitatively, for example, for each of the spectrometers 10a, 10b, 10c, 10d, and 10e. It is now assumed that the user has selected iron (Fe) as an element, Kα-line as an X-ray line name, and 1 as an order (Fe-Lα1) in all of the spectrometers 10a, 10b, 10c, 10d, and 10e. For example, if the user selects conditions (Fe-Lα1) for the specific element to be analyzed quantitatively by manipulating the manual control unit 42, then the controller 38 performs measurements on the sample S by controlling the electron optical system 101 of the analyzer body 100a and the spectrometers 10a-10e.

As a result of the measurements, the spectrum generator 31 stores an X-ray spectrum $SP_1$ of Lα1 line of the specific element Fe detected by the first spectrometer 10a, an X-ray spectrum $SP_2$ of Lα1 line of the element Fe detected by the second spectrometer 10b, an X-ray spectrum $SP_3$ of Lα1 line of the element Fe detected by the third spectrometer 10c, an X-ray spectrum $SP_4$ of Lα1 line of the element Fe detected by the fourth spectrometer 10d, and an X-ray spectrum $SP_5$ of Lα1 line of the element Fe detected by the fifth spectrometer 10e in the data storage device 44.

Figure 4:
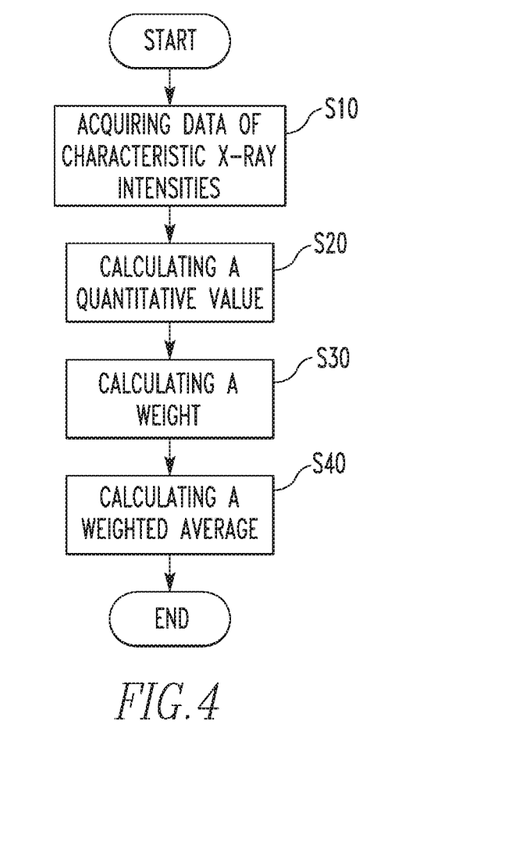
FIG. 4 is a flowchart illustrating one example of a subroutine for quantitative analysis performed by the processor of the sample analyzer shown in FIGS. 1 and 2.

FIG. 4 is a flowchart illustrating one example of subroutine performed by the processor 30 for quantitative analysis.

The quantitative value calculator 32 obtains peak intensity $Int_1$ of the Lα line of the specific element Fe from the X-ray spectrum $SP_1$ stored in the data storage device 44 at step S10 for acquiring data about characteristic X-ray intensities. In this example, the peak intensity $Int_1$ is the peak height $P_1$ (see FIG. 3). Similarly, the quantitative value calculator 32 obtains peak intensities $Int_2$, $Int_3$, $Int_4$, and $Int_5$ from the X-ray spectra $SP_2$, $SP_3$, $SP_4$, and $SP_5$, respectively.

Then, the quantitative value calculator 32 calculates a quantitative value $Conc_1$ for the specific element Fe from the obtained peak intensity $Int_1$ using Eq. (2) at step S20. The calibration line coefficients $A_1$ and $B_1$ for the Lα line of the specific element Fe in the first spectrometer 10a have been obtained by performing measurements on a reference sample of element Fe using the first spectrometer 10a and are stored in the data storage device 44.

Similarly, the quantitative value calculator 32 computes quantitative values $Conc_2$, $Conc_3$, $Conc_4$, and $Conc_5$ from the peak intensities $Int_2$, $Int_3$, $Int_4$, and $In_5$, respectively.

Then, the weight calculator 34 calculates a weight for the quantitative value $Conc_i$ for the specific element Fe calculated by the quantitative value calculator 32, based on the X-ray spectrum $SP_1$, at step S30. In this example, the weight for the quantitative value $Conc_1$ is the peak intensity $Int_1$ of Lα1 line of the specific element Fe. Similarly, the weight calculator 34 calculates the weights $Int_2$, $Int_3$, $Int_4$, and $Int_5$ for the quantitative values $Conc_2$, $Conc_3$, $Conc_4$, and $Conc_5$, respectively.

Then, the weighted average calculator 36 calculates a weighted average, $Conc_{total}$, of the quantitative values $Conc_1$, $Conc_2$, $Conc_3$, $Conc_4$, and $Conc_5$ for the specific element Fe, based on the weights $Int_1$, $Int_2$, $Int_3$, $Int_4$, and $Int_5$ computed by the weight calculator 34, at step S40. For example, the weighted average calculator 36 first calculates a total sum, $Int_{total}$, of the weights $Int_1$, $Int_2$, $Int_3$, $Int_4$, and $Int_5$. Then, the weighted average calculator 36 calculates the weighted average, $Conc_{total}$, from all of the total sum $Int_{total}$, the weights $Int_1$, $Int_2$, $Int_3$, $Int_4$, $Int_5$, and the quantitative values $Conc_1$, $Conc_2$, $Conc_3$, $Conc_4$, and $Conc_5$, using Eq. (3).

As a result of the processing performed as described so far, a quantitative value (weighted average $Conc_{total}$) for the specific element Fe is obtained.

The sample analyzer 100 associated with the present embodiment has the following features.

The sample analyzer 100 includes the quantitative value calculator 32 for calculating quantitative values for a specific element (such as an element of interest) for each of plural data sets about characteristic X-ray intensities, the weight calculator 34 for calculating weights respectively for the quantitative values for the specific element based on the plural data sets about characteristic X-ray intensities, and the weighted average calculator 36 for calculating a weighted average of the quantitative values based on the weights. The sample analyzer 100 calculates quantitative values for the specific element for the plural data sets, respectively, about characteristic X-ray intensities, calculates weights for the quantitative values, respectively, and calculates a weighted average. Consequently, the quantitative values are weighted according to the characteristic X-ray intensity data. Hence, the quantitative accuracy can be enhanced, for example, as compared with the case where plural quantitative values found from plural data sets about characteristic X-ray intensity data are simply averaged.

The sample analyzer 100 is equipped with the plural spectrometers 10a, 10b, 10c, 10d, and 10e and can obtain plural data sets about characteristic X-ray intensities via the spectrometers 10a-10e. As a result, the measurement time can be shortened. Also, the sensitivity can be improved.

In the embodiment described so far, all the spectrometers 10a, 10b, 10c, 10d, and 10e detect the Lα line of the specific element Fe and obtain characteristic X-ray intensity data, and quantitative analysis is performed. Alternatively, the spectrometers 10a, 10b, 10c, 10d, and 10e may detect different types of X-rays of the specific element Fe and obtain characteristic X-ray intensity data, and quantitative analysis may be performed. That is, for example, the first spectrometer 10a may detect Lα1 line of the specific element Fe, the second spectrometer 10b may detect Lβ1 line of the specific element Fe, the third spectrometer 10c may detect Kα1 line of the specific element Fe, and the fourth spectrometer 10d may detect Kβ1 line of the specific element Fe.

In this way, if plural data sets about characteristic X-ray intensities are obtained by detecting different types of characteristic X-rays of the specific element to be analyzed quantitatively, the sample analyzer 100 can have high quantitative accuracy. For example, where plural X-ray spectrometers are disposed and the outputs from the X-ray spectrometers are combined into one, the same type of X-rays must be detected. The sample analyzer 100 does not suffer from this problem. Therefore, different materials can be used as the analyzer crystals of the spectrometers 10a-10e.

3. Modification

A modification of the quantitative analysis performed by the processor 30 of the sample analyzer 100 associated with the present embodiment is next described. In the following description, only the differences with the above-described processing for quantitative analysis performed by the processor 30 are described; a detailed description of similarities is omitted.

In the above embodiment, a weight for each quantitative value $Conc_i$ is a peak intensity $Int_i$ of characteristic X-rays for a specific element to be analyzed quantitatively. In contrast, in the present modification, a weight for each quantitative value $Conc_i$ is a ratio of a peak intensity $Int_i$ (peak height $P_i$) of characteristic X-rays emanating from the specific element to background intensity $B_i$ (ratio P/B).

The weight calculator 34 calculates a weight for each of quantitative values $Conc_i$, based on plural data sets about characteristic X-ray intensities. In particular, the weight calculator 34 obtains peak heights $P_1, P_2, P_3, \ldots, P_n$ from n data sets about characteristic X-ray intensities, respectively. Furthermore, the weight calculator 34 obtains background intensities $B_1, B_2, B_3, \ldots, B_n$ from n data sets about background intensities, respectively.

Each X-ray spectrum contains information about background intensity $B_i$ (such as $B_1$ shown in FIG. 3), i.e., data about background intensities. Therefore, the weight calculator 34 can obtain background intensity data from X-ray spectra.

The weight calculator 34 calculates a weight (ratio P/B) $P_1/B_1$ for the quantitative value $Conc_1$, a weight $P_2/B_2$ for the quantitative value $Conc_2$, a weight $P_3/B_3$ for the quantitative value $Conc_3$, . . . , and a weight $P_n/B_n$ for the quantitative value $Conc_n$ from peak heights $P_1, P_2, P_3, \ldots, P_n$ and from background intensities $B_1, B_2, B_3, \ldots, B_n$.

The weighted average calculator 36 calculates a weighted average, $Conc_{total}$, of quantitative values for a specific element, based on the weights calculated by the weight calculator 34. The weighted average calculator 36 calculates the weighted average $Conc_{total}$, for example, using the following Eq. (4).

$$Conc_{total} = \left[Conc_1 \times \left(\frac{P_1/B_1}{P/B_{total}}\right)\right]$$
$$+ \left[Conc_2 \times \left(\frac{P_2/B_2}{P/B_{total}}\right)\right]$$
$$+ \left[Conc_3 \times \left(\frac{P_3/B_{Total}}{P/B_{total}}\right)\right]$$
$$\vdots$$
$$+ \left[Conc_n \times \left(\frac{P_n/B_n}{P/B_{total}}\right)\right] \quad (4)$$

$(P/B_{total} = P_1/B_1 + P_2/B_2 + P_3/B_3 + \ldots + P_n/B_n)$

Eq. (3) above can also be expressed as follows.

$$Conc_{total} = \frac{\sum_{i=1}^{n}\left\{P_i/B_i \cdot \left[\frac{(Int_i - B_i)}{A_i}\right]\right\}}{\sum_{i=1}^{n} P_i/B_i}$$

Quantitative analysis performed by the processor 30 associated with the present modification is next described. This quantitative analysis is similar to the above-described quantitative analysis associated with the present embodiment except for step S30 for calculating weights and step S40 for calculating a weighted average. Therefore, only these steps S30 and S40 are described below. A description of the other steps S10 and S20 is omitted.

First, the weight calculator 34 calculates a weight for the quantitative value $Conc_1$ for the specific element Fe calculated by the quantitative value calculator 32, based on the X-ray spectrum $SP_1$, at step S30. In particular, the quantitative value calculator 32 calculates peak height $P_1$ and background intensity $B_1$ from the X-ray spectrum $SP_1$ (see FIG. 3), and computes weight $P_1/B_1$. Similarly, the weight calculator 34 calculates weight $P_2/B_2$ for the quantitative value $Conc_2$, weight $P_3/B_3$ for the quantitative value $Conc_3$, weight $P_4/B_4$ for the quantitative value $Conc_4$, and weight $P_5/B_5$ for the quantitative value $Conc_5$, based on the X-ray spectra $SP_2$, $SP_3$, $SP_4$, and $SP_5$, respectively.

Then, the weighted average calculator 36 calculates a weighted average $Conc_{total}$ of the quantitative values $Conc_1$, $Conc_2$, $Conc_3$, $Conc_4$, and $Conc_5$ for the specific element Fe, based on the weights $P_1/B_1$, $P_2/B_2$, $P_3/B_3$, $P_4/B_4$, and $P_5/B_5$, at step S40. For example, the weighted average calculator 36 first calculates a sum total of $P/B_{total}$ of the weights $P_1/B_1$, $P_2/B_2$, $P_3/B_3$, $P_4/B_4$, and $P_5/B_5$, and computes the weighted average $Conc_{total}$ from the sum total $P/B_{total}$, the weights $P_1/B_1$, $P_2/B_2$, $P_3/B_3$, $P_4/B_4$, and $P_5/B_5$, and the quantitative values $Conc_1$, $Conc_2$, $Conc_3$, $Conc_4$, and $Conc_5$, using Eq. (4).

As a result of the processing described so far, the weighted average $Conc_{total}$ of the quantitative values for the specific element Fe is obtained.

In the present modification, a weight for each quantitative value $Conc_i$ is the ratio (P/B) of peak intensity $int_i$ (peak height $P_i$) of characteristic X-rays for the specific element to background intensity $B_i$. Therefore, higher quantitative accuracy can be obtained, for example, than the case where the peak intensity $int_i$ is used as a weight.

It is to be noted that the above-described embodiment and modification are only exemplary and that the present invention is not restricted thereto.

For example, the sample analyzer 100 can perform an area analysis (quantitative mapping) of the weighted average $Conc_{total}$ of the quantitative values for the specific element. The quantitative mapping is a method of performing a quantitative analysis at each point when an area analysis is performed, thus obtaining a two-dimensional distribution of concentration of the element.

Figure 5:
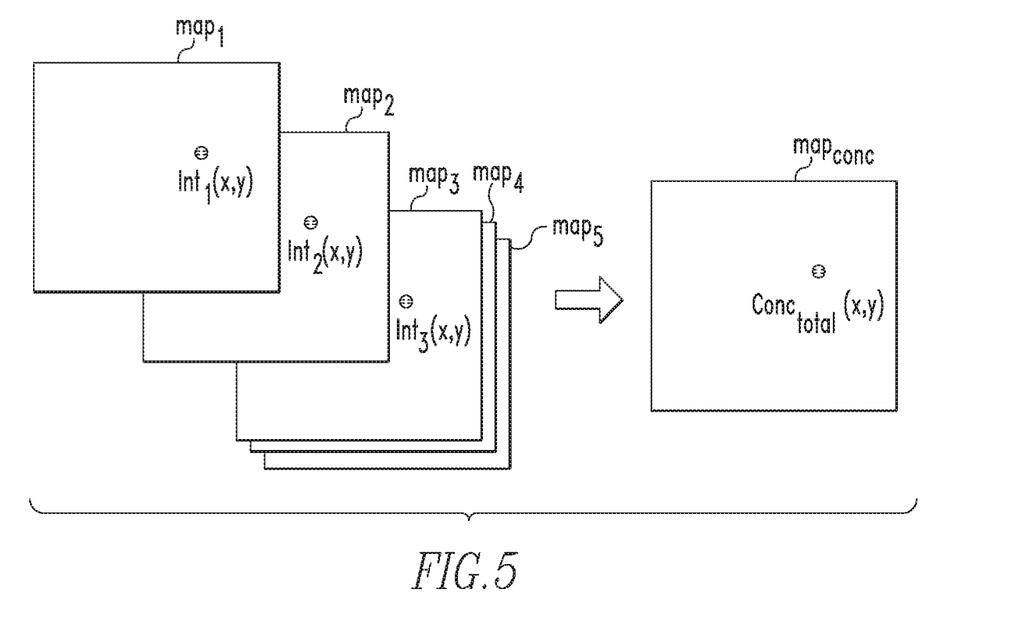
FIG. 5 illustrates a quantitative area analysis in which each weight is a peak intensity.

FIG. 5 illustrates a quantitative area analysis. A distribution of peak intensity $Int_1$ of a specific element is calculated from the results of detection made by the first spectrometer 10a, thus resulting in area analysis results, $map_1$, shown in FIG. 5. A distribution of peak intensity $Int_2$ of the specific element is calculated from the results of detection made by the second spectrometer 10b, thus resulting in area analysis results, $map_2$. A distribution of peak intensity $Int_3$ of the specific element is calculated from the results of detection made by the third spectrometer 10c, thus resulting in area analysis results, $map_3$. A distribution of peak intensity $Int_4$ of the specific element is calculated from the results of detection made by the fourth spectrometer 10d, thus resulting in area analysis results, $map_4$. A distribution of peak intensity $Int_5$ of the specific element is calculated from the results of detection made by the fifth spectrometer 10e, thus resulting in area analysis results, $map_5$.

Processing performed by the processor 30 to perform area analysis of quantitative values of a specific element is described. It is now assumed that peak intensity $Int_i$ is used as a weight.

If the user selects a desired coordinate (x, y) from the area analysis results, $map_1$, displayed on the manual control unit 42 as shown in FIG. 5, the processor 30 stores the peak intensities $Int_1$, $Int_2$, $Int_3$, $Int_4$, and $Int_5$ of the specific element at the coordinate (x, y) of the area analysis results, $map_1$, $map_2$, $map_3$, $map_4$, and $map_5$, in the data storage device 44. The quantitative value calculator 32, weight calculator 34, and weighted average calculator 36 perform the above-described quantitative analysis shown in FIG. 4, using the peak intensities $Int_1$, $Int_2$, $Int_3$, $Int_4$, and $Int_5$. Consequently, a weighted average $Conc_{total}$ of the quantitative values of the specific element at the coordinate (x, y) is calculated when each weight is peak intensity $Int_i$.

This processing is performed for all the coordinates, for example, within a given region. As a result, area analysis results, $map_{conc}$, of the quantitative values (weighted average) $Conc_{total}$ of the specific element can be obtained as shown in FIG. 5.

A modification of the processing performed by the processor 30 for performing area analysis of quantitative values for a specific element is next described. It is assumed that ratio P/B is used as each weight.

Figure 6:
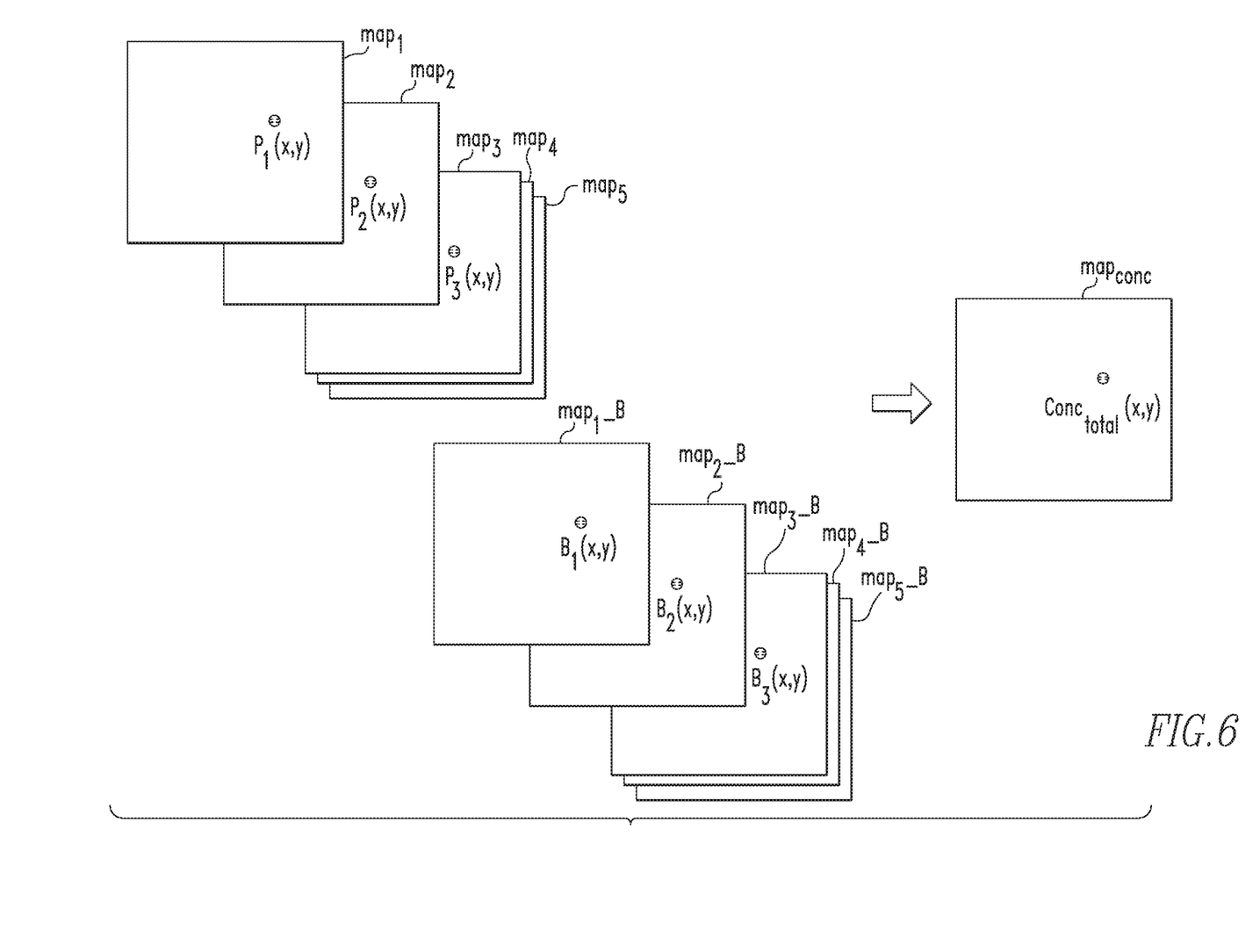
FIG. 6 illustrates a quantitative area analysis in which each weight is a ratio P/B.

FIG. 6 illustrates a quantitative area analysis. A distribution of background intensity $B_1$ is calculated from the result of detection made by the first spectrometer 10a, thus producing area surface result, $map_1\_B$, as shown in FIG. 6. A distribution of background intensity $B_2$ is calculated from the result of detection made by the second spectrometer 10b, thus producing area surface result, $map_2\_B$. A distribution of background intensity $B_3$ is calculated from the result of detection made by the third spectrometer 10c, thus producing area surface result, $map_3\_B$. A distribution of background intensity $B_4$ is calculated from the result of detection made by the fourth spectrometer 10d, thus producing area surface result, $map_4\_B$. A distribution of background intensity $B_5$ is calculated from the result of detection made by the fifth spectrometer 10e, thus producing area surface result, $map_5\_B$.

If the user selects a desired coordinate (x, y) from area analysis results, $map_1$, displayed on the manual control unit 42 as shown in FIG. 6, the processor 30 stores peak heights $P_1$, $P_2$, $P_3$, $P_4$, and $P_5$ of the specific element at the coordinate (x, y) indicated by the area analysis results $map_1$, $map_2$, $map_3$, $map_4$, and $map_5$ in the data storage device 44. Furthermore, the processor 30 stores background intensities $B_1$, $B_2$, $B_3$, $B_4$, and $B_5$ at the coordinate (x, y) indicated by the area analysis results, $map_1\_B$, $map_2\_B$, $map_3\_B$, $map_4\_B$, and $map_5\_B$ in the data storage device 44. The quantitative value calculator 32, weight calculator 34, and weighted average calculator 36 perform quantitative analysis using the peak heights $P_1$, $P_2$, $P_3$, $P_4$, and $P_5$ and the background intensities $B_1$, $B_2$, $B_3$, $B_4$, and $B_5$. As a result, assuming that each weight is ratio P/B, quantitative value (weighted average) $Conc_{total}$ of the specific element at the coordinate (x, y) is calculated.

This processing is performed for all the coordinates, for example, within a given region. As a result, as shown in FIG. 6, an area surface result, $map_{conc}$, of quantitative values (weighted average) $Conc_{total}$ of the specific element can be obtained.

Linear quantitative analysis can be performed similarly.

In the above embodiment and modification, quantitative analysis is performed based on the results of measurements made by the analyzer body 100a. The sample analyzer associated with the present invention may perform quantitative analysis based on the results of measurements performed by other electron probe microanalyzer. In this case, the inventive sample analyzer may not be equipped with the analyzer body 100a.

Furthermore, in the above embodiment and modification, quantitative analysis is performed by irradiating the sample S with the electron beam EB, detecting characteristic X-rays, Xr, emanating from the sample S by means of the plural spectrometers 10a, 10b, 10c, 10d, and 10e, and obtaining plural data sets about the intensities of characteristic X-rays of the specific element. Alternatively, quantitative analysis may be performed by measuring characteristic X-rays, Xr, emanating from the sample S plural times by one spectrometer (e.g., the first spectrometer 10a) and obtaining plural data sets about the intensities of characteristic X-rays of the specific element.

In addition, in the above embodiment and modification, the step S30 for calculating weights is performed after the step S20 for calculating quantitative values as illustrated in FIG. 4. Alternatively, the step S20 for calculating quantitative values may be carried out after the step S30 for calculating weights.

Further, in the above embodiment and modification, each of the spectrometers 10a, 10b, 10c, 10d, and 10e is a wavelength-dispersive X-ray spectrometer (WDS). Each of the spectrometers 10a, 10b, 10c, 10d, and 10e may be an energy-dispersive X-ray spectrometer (EDS).

The present invention embraces configurations substantially identical (e.g., in function, method, and results or in purpose and advantageous effects) with the configurations described in the embodiment of the invention. Furthermore, the invention embraces configurations described in the embodiment and including portions which have non-essential portions replaced. In addition, the invention embraces configurations which produce the same advantageous effects as those produced by the configurations described in the embodiment or which can achieve the same objects as the configurations described in the embodiment. Further, the invention embraces configurations which are similar to the configurations described in the embodiment except that well-known techniques have been added.

Having thus described my invention with the detail and particularity required by the Patent Laws, what is desired protected by Letters Patent is set forth in the following claims.

The invention claimed is:

1. A sample analyzer for performing a qualitative or quantitative analysis on a sample comprising:
   a sample platform for receiving a sample;
   an irradiation source positioned so as to direct an electron beam at a sample positioned on the sample platform;
   a plurality of spectrometers, each spectrometer positioned at a distance from the sample platform, wherein each spectrometer is configured to detect characteristic x-rays emanating from the sample in response to the electron beam irradiating the sample, wherein the characteristic x-rays are associated with a specific element contained in the sample, wherein detecting the characteristic x-rays comprises converting the detected characteristic x-rays into pulsed signals indicating intensity data comprising an intensity for each x-ray energy associated with the specific element; and
   at least one processor in communication with the plurality of spectrometers, the at least one processor programmed or configured to determine a weighted average concentration for the specific element of the sample based on the pulsed signals from the plurality of spectrometers.

2. The sample analyzer of claim 1, wherein the processor is programmed or configured to determine the weighted average concentration for the specific element of the sample by:
   receiving digital data generated from the pulsed signals from each of the plurality of spectrometers;

based on the digital data and for each of the plurality of spectrometers, determining a concentration value associated with each spectrometer for the specific element; and based on the concentration values for the specific element associated with each of the plurality of spectrometers and on the digital data, determining the weighted average concentration for the specific element of the sample.

3. The sample analyzer of claim 1, wherein the intensity data comprises a peak intensity for each of the x-ray energies associated with the specific element.

4. The sample analyzer as set forth in claim 3, wherein the peak intensity comprises a ratio of a peak intensity for the x-ray energy associated with the specific element to a background intensity.

5. A method for qualitatively or quantitatively analyzing a sample comprising:

emitting an electron beam from an irradiation source, the electron beam being directed at a sample positioned on a sample platform;

using a plurality of spectrometers, each spectrometer positioned at a distance from the sample platform, detecting characteristic x-rays emanating from the sample in response to the electron beam irradiating the sample, wherein the characteristic x-rays are associated with a specific element contained in the sample, wherein detecting the characteristic x-rays comprises converting the detected characteristic x-rays into pulsed signals indicating intensity data comprising an intensity for each x-ray energy associated with the specific element; and determining, with at least one processor, a weighted average concentration for the specific element of the sample based on the pulsed signals from the plurality of spectrometers.

6. The method of claim 1, wherein the at least one processor is programmed or configured to determine the weighted average concentration for the specific element of the sample by:

receiving digital data generated from the pulsed signals from each of the plurality of spectrometers;

based on the digital data and for each of the plurality of spectrometers, determining a concentration value associated with each spectrometer for the specific element; and based on the concentration values for the specific element associated with each of the plurality of spectrometers and on the digital data, determining the weighted average concentration for the specific element of the sample.

7. The method of claim 1, wherein the intensity data comprises a peak intensity for each of the x-ray energies associated with the specific element.

8. The method of claim 7, wherein the peak intensity comprises a ratio of a peak intensity for the x-ray energy associated with the specific element to a background intensity.

* * * * *